(12) United States Patent
Vanneste et al.

(10) Patent No.: US 9,328,801 B2
(45) Date of Patent: May 3, 2016

(54) CONNECTION BETWEEN A DRIVE SHAFT OF A MOTOR AND A DRIVEN SHAFT OF A DRIVEN APPARATUS

(71) Applicant: ATLAS COPCO AIRPOWER, naamloze vennootschap, Wilrijk (BE)

(72) Inventors: Sofie Kris Vanneste, Hamme (BE); Erik Eric Daniel Moens, Maldegem-Kleit (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 14/371,324

(22) PCT Filed: Dec. 18, 2012

(86) PCT No.: PCT/BE2012/000054
§ 371 (c)(1),
(2) Date: Jul. 9, 2014

(87) PCT Pub. No.: WO2013/104030
PCT Pub. Date: Jul. 18, 2013

(65) Prior Publication Data
US 2015/0007678 A1    Jan. 8, 2015

(30) Foreign Application Priority Data

Jan. 13, 2012  (BE) .................................. 2012/0028

(51) Int. Cl.
*F16H 1/10*    (2006.01)
(52) U.S. Cl.
CPC ............. *F16H 1/10* (2013.01); *Y10T 74/19679* (2015.01)

(58) Field of Classification Search
CPC ............. F16H 1/06; F16H 1/10; F16H 57/02; F16H 57/022; H02K 7/116; Y10T 74/19679
USPC .................... 74/396, 397, 404, 414
See application file for complete search history.

(56) References Cited

U.S. PATENT DOCUMENTS

| | | | | |
|---|---|---|---|---|
| 1,722,091 A | * | 7/1929 | Irwin | .............................. 74/333 |
| 2,667,089 A | * | 1/1954 | Gregory | ........................ 475/172 |

(Continued)

FOREIGN PATENT DOCUMENTS

| | | |
|---|---|---|
| DE | 1450768 B1 | 7/1970 |
| JP | 48046102 U | 6/1973 |

(Continued)

OTHER PUBLICATIONS

International Search Report (ISR) dated Jul. 10, 2013, for PCT/BE2012/000054.

(Continued)

*Primary Examiner* — William Kelleher
*Assistant Examiner* — Leonard J Archuleta
(74) *Attorney, Agent, or Firm* — Bacon & Thomas, PLLC

(57) ABSTRACT

Connection between a drive shaft and a driven shaft, and this connection is realised by means of a drive gearwheel on the drive shaft and a driven gearwheel on the driven shaft, whereby the drive gearwheel and the driven gearwheel are affixed in a housing, and this housing is on the one hand connected to a housing of the motor, and on the other hand is connected to a housing of the driven apparatus, and whereby the drive gearwheel or the driven gearwheel is a ring gear with internal toothing and the remaining gearwheel of the connection is a pinion with external toothing.

13 Claims, 5 Drawing Sheets

(56) References Cited

U.S. PATENT DOCUMENTS

| | | | |
|---|---|---|---|
| 2,851,896 A | 9/1958 | Ordway | |
| 3,762,272 A * | 10/1973 | Escobedo | 409/74 |
| 6,755,271 B1 * | 6/2004 | Berg | 180/190 |
| 7,011,275 B2 * | 3/2006 | Redfern | 244/60 |
| 2010/0206649 A1 * | 8/2010 | Ishii | 180/65.31 |

FOREIGN PATENT DOCUMENTS

| | | |
|---|---|---|
| JP | S54-176076 U | 12/1979 |
| JP | 2010-38323 A | 2/2010 |

OTHER PUBLICATIONS

Written Opinion dated Jul. 10, 2013, for PCT/BE2012/000054.

International Preliminary Report on Patentability (IPRP) dated Jan. 30, 2014, for PCT/BE2012/000054.

Japanese Office Action dated Dec. 2, 2015, for JP 2014-551486, and English translation thereof.

* cited by examiner

PRIOR ART

CONNECTION BETWEEN A DRIVE SHAFT OF A MOTOR AND A DRIVEN SHAFT OF A DRIVEN APPARATUS

BACKGROUND OF THE INVENTION

The present invention relates to a connection between a drive shaft of a motor and a driven shaft of a driven apparatus.

Without restricting the invention to this, more specifically the present invention relates to such a connection between a drive shaft of a motor and a driven shaft of a driven apparatus, whereby the shafts extend in an axial direction at a certain lateral distance from one another, whereby the connection is realised by means of a drive gearwheel on the drive shaft and a driven gearwheel on the driven shaft, whereby the drive gearwheel and the driven gearwheel directly mesh with one other and these gearwheels are affixed in a housing, and this housing is connected to a housing of the motor on the one hand, and to a housing of the driven apparatus on the other hand.

Such a connection to which the invention relates, is simple with regard to its construction and is of a limited compact size, as the drive gearwheel on the drive shaft directly meshes with a driven gearwheel on the driven shaft without there being additional gearwheels.

The motor can, for example, be an electric motor or a combustion engine or similar.

The driven apparatus can, for example, typically be a compressor element.

According to the state of the art, such connections of the aforementioned type between a drive shaft and a driven shaft are already known, but the known connections present a number of disadvantages.

More specifically the gearwheels, with which the connection is formed, are intended to realise a certain transmission ratio, whereby the angular velocity of the drive shaft is converted into a different angular velocity of the driven shaft.

To this end, in the known connections a gearwheel with external toothing is provided on the drive shaft and on the driven shaft, generally a large gearwheel on the drive shaft that meshes with a small gearwheel on the driven shaft.

Compressors, for example, have to run at a very high speed in order to build up a sufficient pressure, whereby the angular velocity of the drive shaft generally has to be geared up via the gear transmission.

The transmission ratio to be realised, which corresponds to the ratio between the diameters of the gearwheels concerned of the gear transmission, thus often has to be very high.

However, in practice the transmission ratio cannot be increased without limit.

When using gearwheels of ordinary quality, such as for example helical gears that satisfy the DIN 3961 standard—class L6, the maximum limit for the transmission ratio turns out to be 3 for example, because above this limit the contact between the teeth of the gearwheels leads to excessive noise.

This can be remedied, for example, by using gearwheels of a higher quality, which means an enormous additional cost however, which for the application concerned has to be limited as much as possible.

Of course it is also the case that the transmission ratio can be increased by using a number of gearwheels and additional shafts, but this is at the expense of the compactness and simplicity of the connection, which in the context of this invention is an undesirable alternative.

A great disadvantage of the known connections to which the present invention relates, is that only a limited transmission ratio, typically 3, can be realised, at least insofar the simplicity and dimensions of the connection, as well as the quality of the gearwheels and the cost of the gearwheels coupled to this, is to be limited.

Another disadvantage of the known connections to which the invention relates is that changing the transmission ratio between the gearwheels requires a lot of modifications.

In the known connections to which the invention relates, the drive shaft and the driven shaft are located a certain fixed lateral distance from one another, such that both the drive gearwheel and the driven gearwheel have to be replaced if the transmission ratio is changed.

This means that many different gearwheels have to be provided on the one hand, and that such a change of the transmission ratio requires a lot of assembly work on the other hand.

Moreover the fixed lateral distance between the drive shaft and the driven shaft places severe restrictions on the choices for the composition of a gearwheel pair with which the desired transmission ratio can be obtained.

This difficulty also stands in the way of rigorous standardisation of the known connections to which the invention relates.

The purpose of the invention is to provide a solution to one or more of the foregoing disadvantages and any other disadvantages.

More specifically the purpose of the invention is to realise a connection between a drive shaft of a motor and a driven shaft of a driven apparatus, and this connection enables a high transmission ratio, but whereby the connection is of a compact and simple construction.

Moreover, it is the purpose of the invention to realise an aforementioned connection that enables rigorous standardisation, and whereby the transmission ratio can be changed without much difficulty.

SUMMARY OF THE INVENTION

To this end the invention concerns a connection between a drive shaft of a motor and a driven shaft of a driven apparatus, whereby the drive shaft extends in an axial direction and the driven shaft parallel to this, at a certain lateral distance from this axial direction, extends in a parallel axial direction, whereby the connection is realised by means of a drive gearwheel on the drive shaft and a driven gearwheel on the driven shaft, whereby the drive gearwheel and the driven gearwheel mesh directly with one another, and these gearwheels are affixed in a housing, and this housing is on the one hand connected to a housing of the motor, and on the other hand is connected to a housing of the driven apparatus, and whereby the drive gearwheel or the driven gearwheel is a ring gear with internal toothing and the remaining gearwheel of the connection is a pinion with external toothing, wherein the housing of the connection is equipped with adjustment means with which mutual lateral distance between the driven shaft and the drive shaft can be adjusted and wherein the housing of the connection comprises a first part and a second part, and these parts each have a hole through which a shaft is affixed, either the drive shaft or the driven shaft, and whereby the aforementioned adjustment means are formed by fasteners with which the first part and the second part of the housing can be detachably fastened to one another.

To drive compressors for example, preferably the ring gear with internal toothing is the drive gearwheel and the pinion the driven gearwheel, so that the angular velocity of the shaft that drives the compressor is increased.

However, it is clear that from a technical point of view that it is not important whether the drive shaft is the faster rotating shaft or the slower rotating shaft, such that an embodiment in which a ring gear with internal toothing is used on the driven shaft and a pinion on the drive shaft can also apply according to the invention.

A big advantage of a connection according to the invention is that a high transmission ratio can be realised, for example to drive an apparatus at a very high speed, whereby the size of the connection is still compact and of a simple structure.

A first important reason for this is of course that the ring gear with internal toothing can take on a proportionally larger diameter without increasing the size of the total connection, compared to a situation with two gearwheels with external toothing, as the pinion is affixed inside the ring gear, so that a much higher transmission ratio is possible with the same required volume of the connection.

Another important reason why the transmission ratio in a connection according to the invention can be higher than with known connections, is the result of the fact that the 'contact ratio' in a gearwheel pair consisting of a ring gear with internal toothing and a pinion with external toothing, such as in a connection according to the invention, is higher than with gearwheel pairs consisting of two gearwheels with external toothing as in a known connection.

This contact ratio is the ratio that reflects the average number of pairs of teeth of the toothing that are in contact in meshing gearwheels.

With a higher contact ratio, such as with a pinion that meshes with the internal toothing of a ring gear, the impact between the gearwheels concerned is less, resulting in fewer vibrations and thus less noise generation.

Moreover, the contact ratio with gearwheels with straight toothing is less than with gearwheels with helical toothing.

With the known connections to which the invention relates, in which a gearwheel pair is used consisting of two gearwheels with external toothing, helical toothing is thus always used, as the application of straight toothing with a small contact ratio would lead to too much noise generation.

With a gearwheel pair consisting of a ring gear with internal toothing and a pinion, as applied in a connection according to the invention, the aforementioned contact ratio is always higher, both with straight and helical toothing, and this without excessive noise being generated when the gearwheels rotate.

Consequently with a connection according to the invention a higher transmission ratio can be realised than with known connections, and this within a housing of a limited size with gearwheels of ordinary quality, whereby gearwheels with straight toothing and with helical toothing can be applied.

According to the invention, the housing of the connection is equipped with adjustment means whereby the mutual lateral distance between the driven shaft and the drive shaft can be adjusted.

This embodiment of a connection according to the invention is extremely advantageous as it enables a high degree of standardisation.

Indeed, if the mutual lateral distance between the drive shaft and the driven shaft can be adjusted, a number of transmission ratios can be realised with the same ring gear, as it is sufficient to just replace the pinion on the driven shaft with a pinion with a larger or smaller diameter and to adjust the lateral distance between the driven shaft and drive shaft accordingly.

Thus to change the transmission ratio in a connection according to the invention only one gearwheel is replaced, while with known connections of this type both gearwheels always have to be replaced.

A connection according to the invention is thus much more economically favourable.

Moreover a connection according to invention automatically leads to a certain standardisation, as a number of transmission ratios can be realised with the same ring gear.

This is in stark contrast to the known connections in which the size of the connection housing is determined by the combination of the gearwheel on the drive shaft and the gearwheel on the driven shaft, which gives rise to a greater variety of housings or to housings that are too big and only partially utilised.

According to the invention, the connection housing comprises a first and a second part, and these parts are each provided with a hole through which a shaft is affixed, either the drive shaft or the driven shaft, and whereby the aforementioned adjustment means are formed by fasteners with which the first part and the second part of the housing can be detachably fastened together.

Preferably according to the invention the aforementioned fasteners consist of a number of identically shaped coupling elements that are provided on the first part of the housing and which mate with a number of identically shaped coupling elements that our provided on the second part of the housing, whereby the coupling elements on each part of the housing exhibit a rotational symmetry with respect to a rotational axis of symmetry, which in an assembled state of the connection does not coincide with the drive shaft or the driven shaft.

Such an embodiment of a connection according to the invention is extremely practical as the rotational symmetrical construction of the identically shaped coupling elements ensures that the first part the housing can be fastened to the second part of the housing in a number of positions using the fasteners.

Thereby after releasing the fasteners, the first part can be brought from a first position to another position by rotating the first part over a certain angle corresponding to the turning angle or a multiple thereof of the rotational symmetry, combined or otherwise with one or more axial movements to move the first and second parts to and from one another.

Moreover, as the aforementioned rotational axis of symmetry in the assembled state does not coincide with the drive shaft or the driven shaft, through a simple turn of the first part with respect to the second part, the lateral distance between the drive shaft and the driven shaft will change and this lateral distance can be adjusted by such a turn.

It is clear that such an embodiment is extremely practical, as in event of a change of the transmission ratio, only the pinion has be replaced and the lateral distance between the driven shaft and the drive shaft can be simply adjusted by turning the first part with respect to the second part to a position with the desired lateral distance between them.

In brief such an embodiment of a connection according to the invention can be made extremely compact, as the dimensions of the connection housing are determined by the size of the ring gear, and this ring gear is not changed by a change of the transmission ratio.

Moreover such a connection according to the invention is very practical to use in applications, with diverse transmission ratios.

With the intention of better showing the characteristics of the invention, a few preferred embodiments of one or more connections according to the invention are described hereinafter by way of an example, without any limiting nature, with reference to the accompanying drawings, wherein:

DETAILED DESCRIPTION OF THE INVENTION

Figure 1:
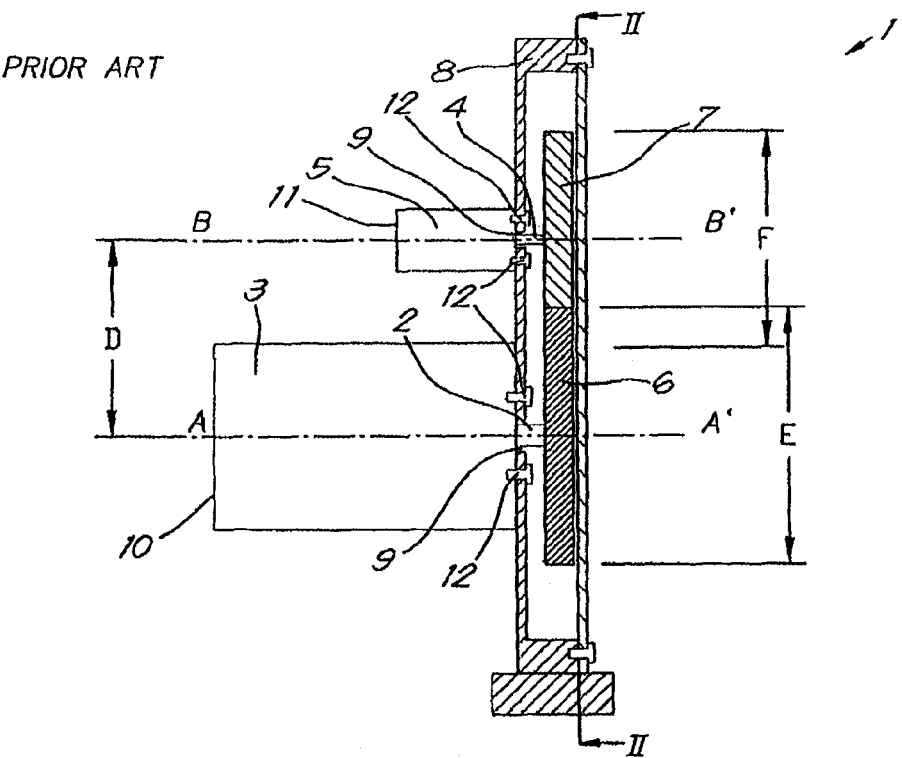
FIG. 1 shows a longitudinal cross-section through a known connection between a motor and a driven apparatus.
Figure 2:
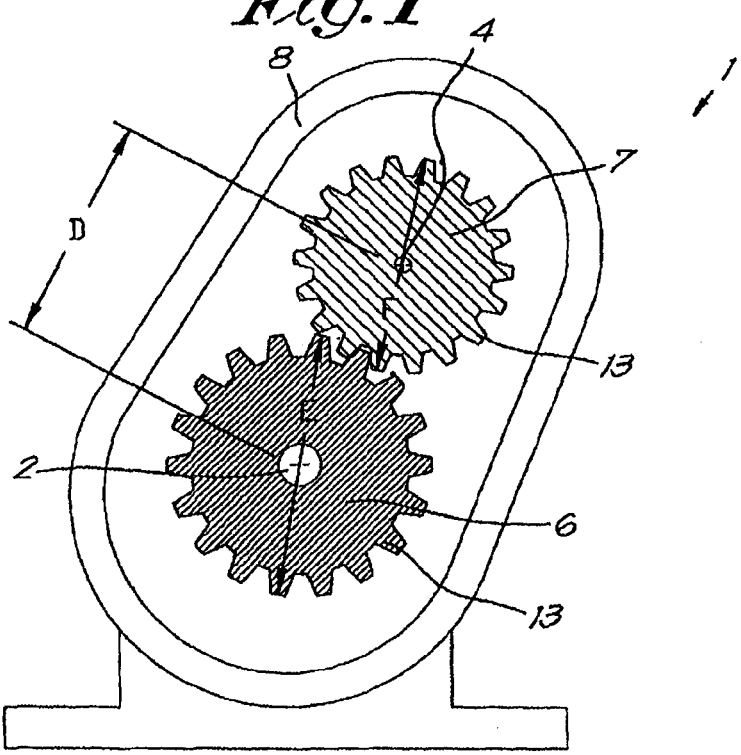
FIG. 2 shows a transverse cross-section through the connection shown in FIG. 1 according to line II-II.

FIGS. 1 and 2 show a known connection 1 between a drive shaft 2 of a motor 3 and a driven shaft 4 of a driven apparatus 5.

The motor 3 is for example an electric motor or combustion engine and the driven apparatus 5 is for example the rotor of a compressor or similar.

The central axis of symmetry of the drive shaft 2 extends along an axial direction AA' and the central axis of symmetry of the driven shaft 4 extends along an axial direction BB' parallel to and at a certain distance D from the aforementioned axial direction AA'.

In order to couple the two shafts 2 and 4 together, the connection 1 is equipped with a drive gearwheel 6 mounted on the drive shaft 2 and a driven gearwheel 7 mounted on the driven shaft 4.

It is important to note that the invention relates to such connections 1, whereby the drive gearwheel 6 and the driven gearwheel 7 directly mesh with one another and whereby there are no intermediate gearwheels and/or shafts, for example to realise a higher transmission ratio in a number of stages, so that the connections 1 to which the invention relates are of a very simple type.

Furthermore the connection 1 also contains a housing 8, whereby the drive shaft 2 and the driven shaft 4 at least partially extend through holes 9 in the wall of the housing to within the housing 8 and whereby the drive gearwheel 6 and the driven gearwheel 7 are also enclosed by the housing 8.

The housing 8 is, on the one hand, connected to a housing 10 of the motor 3 and, on the other hand, to a housing 11 of the driven apparatus 5, whereby bolts 12 have been used in this case.

Of course other ways to connect the housing 8 to the motor 3 or the driven apparatus 5 are not excluded, such as by means of a welded joint or similar for example, and the housing 8 can even partially form part of the motor housing 10 or the housing 11 of the driven apparatus 5.

It is characteristic of the known connections 1 of the aforementioned type that for the drive gearwheel 6 and the driven gearwheel 7, gearwheels with external toothing 13 are used, whereby in practice this external toothing 13 is generally helical toothing in order to obtain a sufficiently high contact ratio, and thus to reduce the impact, vibrations and noise as a result of the rotation.

In the example shown, the drive gearwheel 6 has a diameter E that is larger than the diameter F of the driven gearwheel 7, so that a transmission ratio E/F is obtained whereby the driven gearwheel 7 turns faster than the drive gearwheel 6.

Of course in practice there are also known connections 1 whereby conversely the drive gearwheel 6 has a diameter E that is smaller than the diameter F of the driven gearwheel 7, so that a transmission ratio E/F is obtained, whereby the driven gearwheel 7 turns more slowly than the drive gearwheel 6. If a higher transmission ratio is to be obtained, as is known the ratio between the diameters E and F of the gearwheels 6 and 7 concerned is increased, which can only be done to a limited extent as the lateral spacing D between the shafts 2 and 4 imposes a limit on the largest diameter E or F.

The disadvantages of these known connections 1 have already been discussed in the introduction and primarily consist of a lot of space being lost in such a configuration with gearwheels 6 and 7 that have external toothing, that there is little flexibility in changing to a different transmission ratio as the lateral distance D between the shafts 2 and 4 is a fixed item and both gearwheels 6 and 7 thus have to be changed each time, and that the configuration gives rise to housings 8 of all kinds of types and sizes, gearwheel pairs 6 and 7 in all kinds of sizes depending on the application, so that there is no question of standardisation.

Figure 3:
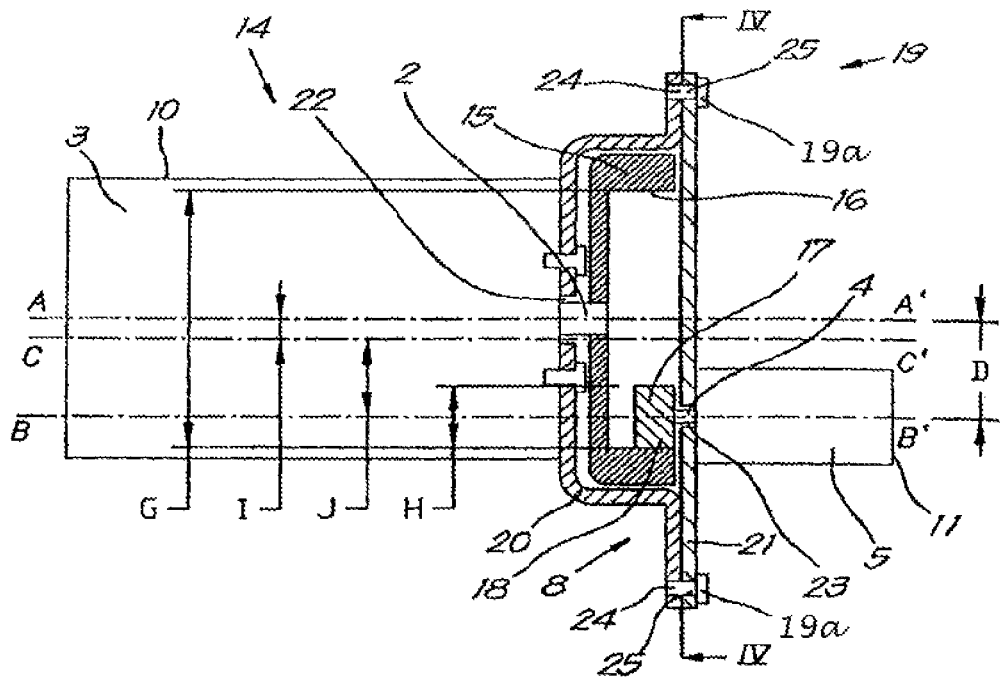
FIG. 3, analogous to FIG. 1, shows a longitudinal cross-section through a connection according to the invention, in which a first transmission ratio is applied.
Figure 4:
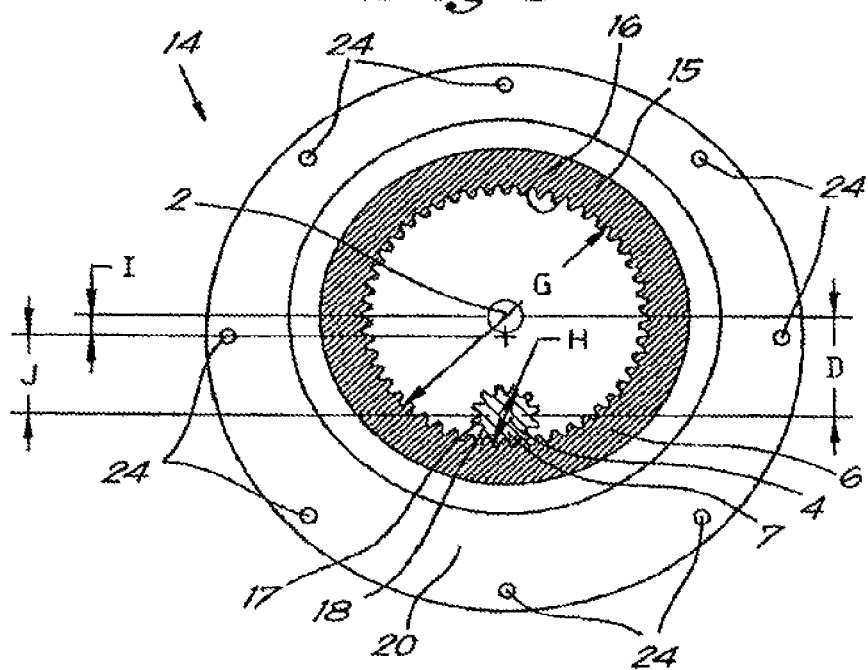
FIG. 4, analogous to FIG. 2, shows a transverse cross-section through the connection shown in FIG. 3 according to line IV-IV.

FIGS. 3 and 4 show a connection 14 according to the invention.

A first important aspect of such a connection 14 according to invention is that the pair of gearwheels 6 and 7 consist of a ring gear 15 with internal toothing 16 and internal diameter G and a pinion 17 with external toothing 18 with external diameter H.

More specifically, in the example shown the ring gear 15 with internal toothing 16 is the drive gearwheel 6 and the pinion 17 with external toothing 18 is the driven gearwheel 7, so that the driven shaft 4 turns at a higher speed than the drive shaft 2.

However it is not excluded according to the invention to drive the ring gear 15 with a pinion 17 to obtain precisely the opposite, i.e. a speed of the driven shaft 4 that is less than that of the drive shaft 2.

The transmission ratio G/H reflects how many revolutions the pinion 17 undergoes for a complete revolution of the ring gear 15.

By comparing the geometry of the known connections 1 to the geometry of a connection 14 according to the invention, it is clear that for the same lateral spacing D between the drive shaft 2 and the driven shaft 4, with a connection 14 according to the invention a much higher transmission ratio G/H can be obtained compared to the transmission ratio E/F obtained with the known connections 1.

Another important aspect of a connection 14 according to the invention is that the housing 8 of the connection is equipped with adjustment means 19, whereby the mutual lateral distance D between the driven shaft 4 and the drive shaft 2 can be adjusted.

As illustrated in the example of FIGS. 3 and 4, according to the invention these adjustment means 19 are realised as follows.

First and foremost the housing 8 of the connection 14 comprises a first part 20 and a second part 21.

In this case the first part 20 of the housing 8 forms a casing for the gearwheels 15 and 17, and the second part 21 is a removable cover 21 to close off the casing 20, but many other possible embodiments are not excluded, such as for example an embodiment in which the second part 21 also partially encloses the gearwheels 15 and 17 or similar.

Furthermore in the example shown, the first part 20 of the housing 8 is connected to the motor housing 10 and the second part 21 of the housing 8 is connected to the housing 11 of the driven apparatus 5, but in another, embodiment the second part 21 of the housing 8 can just as well be connected to the housing 10 of the motor 3 and the first part 20 of the housing 8 to the housing 11 of the driven apparatus 5.

In each of the parts 20 and 21 of the housing 8 there is also a hole, respectively a hole 22 in the first part 20 and a hole 23 in the second part 21.

The intention here is to affix one of the shafts through each of these holes 22 and 23, either the drive shaft 2 or the driven shaft 4.

For convenience these holes 22 and 23 are preferably circular and the shafts 2 and are preferably affixed in the holes 22 and 23 such that the axial direction AA' or BB' of the shafts 2 and 4 concerned extend through the centre of the corresponding hole 22 or 23.

In brief, it is clear that, after fastening the first part 20 and the second part 21 together, the position of the holes 22 and 23 in each of the parts 20 and 21 of the housing 8 and the position of each of the parts 20 and 21 of the housing 8 on the housing 10 or 11 concerned of the motor 3 or the driven apparatus 5 determine the position of the shafts 2 and 4 with respect to one another, and in particular the lateral distance D between these shafts 2 and 4.

According to invention, the aforementioned adjustment means 19 to adjust the lateral distance D between the drive shaft 2 and the driven shaft 4 are formed by fasteners 19 with which the first part 20 and the second part 21 of the housing 8 can be detachably fastened together.

In order to adjust the lateral distance D between the shafts 2 and 4, in principle it is sufficient for the two parts 20 and 21 to be able to be fastened together with the fasteners 19 in different positions with respect one another.

To this end very many embodiments are conceivable, but according to the invention a specific embodiment is particularly practical to this end, i.e. an embodiment in which the first part 20 can be fastened to the second part 21 in a first position and a second position with the fasteners 19, whereby, after releasing the fasteners 19, the first part 20 can be taken from the first position to the second position by rotating the first part 20 over a certain angle, combined or otherwise with one or more axial movements to move the first part 20 and the second part 21 to and from one another.

As is the case in the example of FIGS. 3 and 4, according to the invention the first part 20 can preferably be fastened to the second part 21 in a number of positions with the fasteners 19.

In order to enable this, the fasteners 19 on each part 20 and 21 of the housing 8 present a rotational symmetry with respect to a rotational axis of symmetry, whereby in an assembled state of the connection 14, these rotational symmetry axes form the same common rotational axis of symmetry CC'.

This can be realised for example by providing the first part 20 and the second part 21 of the housing 8 with a circular flange with a coated friction surface, whereby these flanges can be clamped together by means of external clamps.

Such an embodiment enables the first part 20 and the second part 21 to be placed in any position with respect one another.

However, such an embodiment would require additional alignment means, for example in the form of a centring edge or alignment pins ("dowels") or similar.

For a turn of the first part 20 with respect to the second part 21 of the housing 8 to result in a change of the lateral distance D between the shafts 2 and 4, it must be ensured that in an assembled state of the connection 14, neither the central axis of symmetry or the axial direction AA' of the drive shaft 2, nor the central axis of symmetry or the axial direction BB' of the driven shaft 4 coincide with the rotational axis of symmetry CC' of the fasteners 19.

It is clear that with such a method of fastening the parts 20 and 21 of the housing 8, a very uniform whole is obtained whereby the same housing 8 enables the lateral distance D to be adjusted by a simple turn of the parts 20 and 21 with respect to one another, so that a number of configurations with different transmission ratios can be realised.

It is also advantageous here that in the event of a change of the transmission ratio, the ring gear 15 can be kept and only the pinion 17 needs to be replaced.

In the embodiment of FIGS. 3 and 4, a somewhat different, fastening method is applied, whereby the parts 20 and 21 can be fastened in a limited number of positions with respect to one another, more specifically in this case in eight different positions.

To this end, in this case the fasteners 19 consist of a number of identically shaped coupling elements 24 that are provided on the first part 20 of the housing 8 and which mate with a number of identically shaped coupling elements 25 that are provided on the second part 21 of the housing 8.

In the embodiment shown these coupling elements 24 and 25 are formed by holes 24 and 25 placed at regular distances from one another in a circumference around the rotational axis of symmetry CC'.

Furthermore, in addition to these coupling elements 24 and 25 in the form of holes 24 and 25 in the parts 20 and 21, the fasteners 19 in this case of course consist of bolts and/or nuts 19a that are intended to be affixed in these holes 24 and 25 in order to effectively couple and align the parts 20 and 21 of the housing 8 with respect one another.

It is however clear that other identically shaped coupling elements can be used in order to achieve the same result, for example coupling elements on the first part 20 consisting of bolts that also present ‚a rotational symmetry with respect to the rotational axis of symmetry CC' and which can mate with the holes 25 on the second part 21, as in the embodiment of FIGS. 3 and 4.

Many other possible embodiments are not excluded here.

The uniformity of shape of the coupling elements 24 and 25 together with their rotational symmetrical arrangement with respect to the rotational axis of symmetry CC' enable the two parts 20 and 21 of the housing 8 to be placed on one another in different positions.

In the example shown in FIGS. 3 and 4, it is further the case that the hole 22, which in this case is intended for the drive shaft 2, is placed in the first part 20 of the housing 8 with an eccentricity I with respect to the rotational axis of symmetry CC'.

On the other hand the hole 23, which in this case is intended to affix the driven shaft 4, is placed in the second part 21 of the housing 8 with an eccentricity J.

Assuming that the shafts 2 and 4 are affixed centrally in the respective holes 22 and 23, which means that in an assembled state of the connection 14 each of the shafts 2 have the same eccentricity, respectively I and J, with respect to the rotational axis of symmetry CC'.

Furthermore, in the example of FIGS. 3 and 4 it is the case that the two parts 20 and 21 are placed on each other such that the drive shaft 2 with the ring gear 15 is placed above the rotational axis of symmetry CC' with an eccentricity I, while the driven shaft 4 is placed below the rotational axis of symmetry CC' with an eccentricity J.

In more general terms it can be said that in the position of FIGS. 3 and 4 the drive shaft 2 is parallel to the rotational axis of symmetry CC', but located at a distance I from this rotational axis of symmetry CC', that the driven shaft 4 is also parallel to the rotational axis of symmetry CC' but located at a distance J from this rotational axis of symmetry CC' and that the rotational axis of symmetry CC' is in the same plane as the shafts 2 and 4 and between these two shafts 2 and 4.

In this first position of FIGS. 3 and 4, the lateral distance D between the shafts 2 and 4 is then determined by the sum of the eccentricities I and J.

For a certain size of the internal diameter G of the ring gear 15, the size of the external diameter H of the pinion 17 is also fixed, as in this case the radius G/2 less the lateral spacing D practically corresponds to the radius H/2 of the external toothing of the pinion 17.

In a first position of the parts 20 and 21 of the housing 8 according to FIGS. 3 and 4, the lateral spacing D is relatively large, which results in a relatively small external diameter H of the pinion 17 and thus in a relatively high transmission ratio G/H.

FIGS. 5 and 6 again show a connection 14 according to the invention between the drive shaft 2 of the same motor 3 and the driven shaft 4 of the same apparatus 5, in which the transmission ratio is different however.

The same ring gear 15 is used here, as well as the same housing 8 with the same parts 20 and 21 as in FIGS. 3 and 4, but a different pinion 17 with a different external diameter K has been applied and the parts 20 and 21 are placed in a different second position with respect one another.

Figure 5:
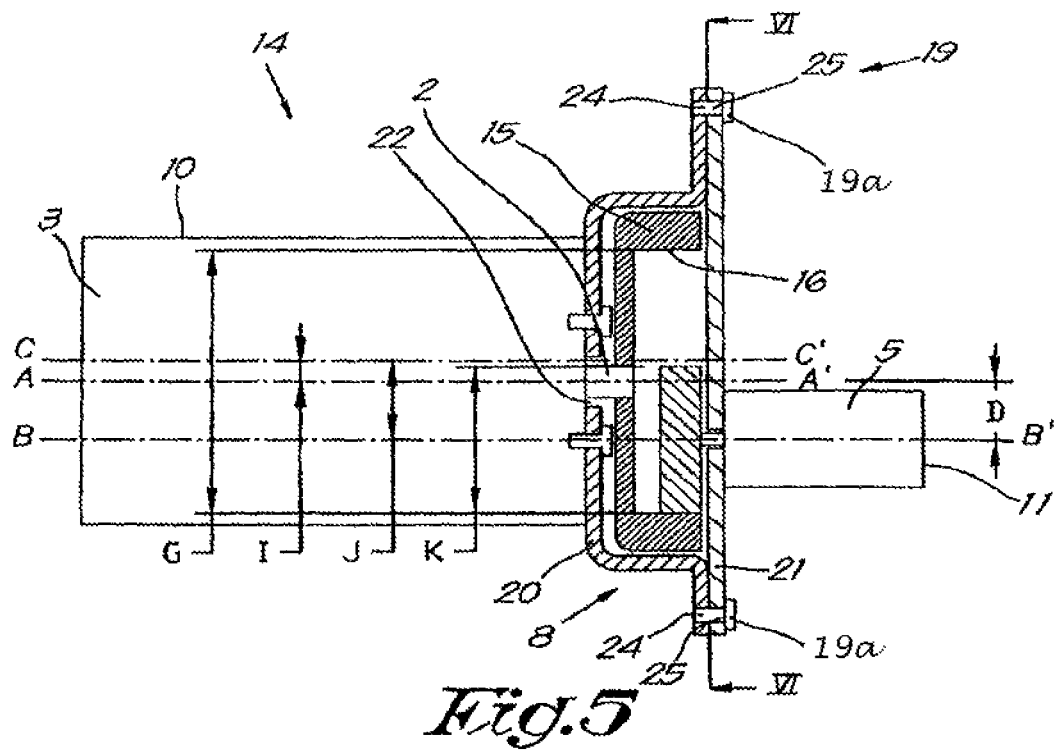
FIGS. 5 and 6, analogous to FIGS. 3 and 4, respectively show a longitudinal cross-section and a transverse cross-section through a connection according to the invention for the same motor and the same driven apparatus as in FIGS. 3 and 4, but in which a second transmission ratio is applied.
Figure 6:
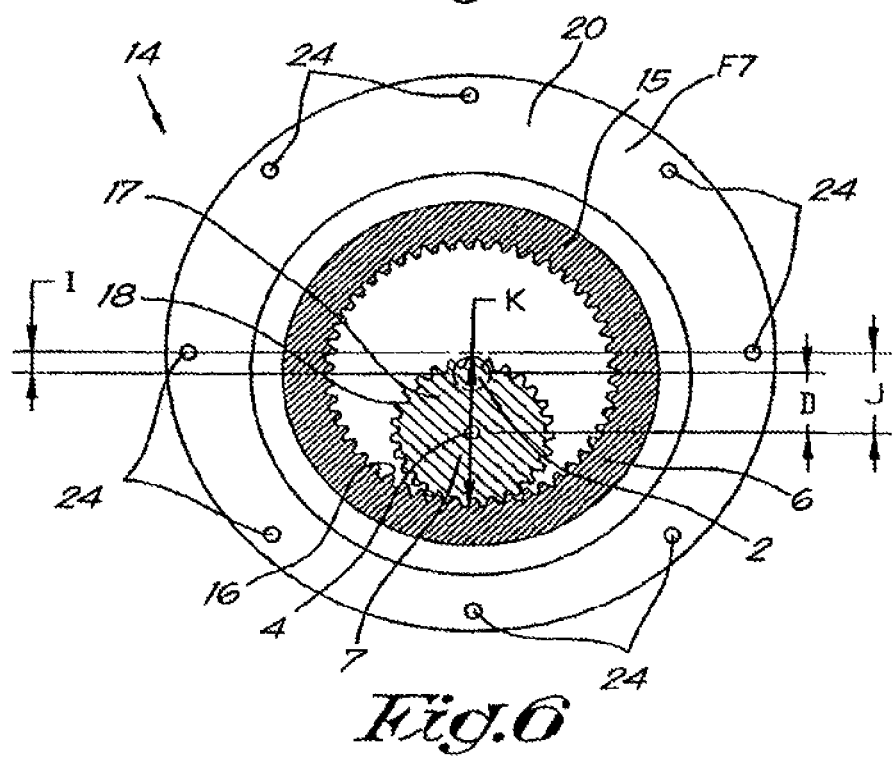

More specifically, from the first position shown in FIGS. 3 and 4, the first part 20 is placed in a second position by turning it by 180° with respect to the second part 21, as shown in FIGS. 5 and 6.

The holes 22 and 23 are still placed with the same eccentricity I and J with respect to the rotational axis of symmetry CC' in their part concerned, but these eccentricities I and J are oriented differently with respect one another, such that the lateral spacing D has changed.

Indeed, in the example of FIGS. 5 and 6 the two parts 20 and 21 are placed on each other such that the drive shaft 2 with the ring gear 15 is placed under the rotational axis of symmetry CC' with an eccentricity I, and the driven shaft 4 is placed under the rotational axis of symmetry CC' with an eccentricity J.

In more general terms it can be said that in the second position of FIGS. 5 and 6 the drive shaft 2 is parallel to the rotational axis of symmetry CC' but located at a distance I from this rotational axis of Symmetry CC', and the driven shaft 4 is also parallel to the rotational axis of symmetry CC' but located at a distance J from this rotational axis of symmetry CC', and that the rotational axis of symmetry CC' is located in the same plane as the shafts 2 and 4, while in this case the drive shaft 2 is located between the driven shaft 4 and the rotational symmetry shaft CC', which was not the case in FIGS. 3 and 4.

In this second position of FIGS. 5 and 6 the lateral distance D between the shafts 2 and 4 is thus determined by the difference between the eccentricities I and J.

In this second position of FIGS. 5 and 6 the radius G/2 of the ring gear 15 less the lateral spacing D must practically correspond to the radius K/2 of the external toothing 18 of the pinion 17, and as the diameter G has not been changed and the lateral distance D between the shafts 2 and 4 has been reduced with respect to the first position shown in FIGS. 3 and 4, for the ring gear 15 and pinion 17 to mesh correctly, the diameter K of the pinion 17 in the second position must be greater than in the first position.

Consequently the transmission ratio G/K with the parts 20 and 21 placed in accordance with FIGS. 5 and 6 is less than the transmission ratio G/H realised when the parts 20 and 21 were placed in the first position shown in FIGS. 3 and 4.

More specifically, for the same ring gear 15 and housing 8 the transmission ratio G/H is a maximum, when the parts 20 and 21 are placed in the first position according to FIGS. 3 and 4, while the transmission ratio G/K is a minimum when the parts 20 and 21 are placed in the second position according to FIGS. 5 and 6.

It is clear that the parts 20 and 21 can be placed in other positions with respect to one another according to an angle of turn, which in this case is a multiple of 45° on account of the configuration with eight holes 24, whereby in these different positions of the parts 20 and 21 with respect to one another, the eccentricities I and J are still oriented differently with respect to the rotational axis of symmetry CC', and are no longer located in the same plane, whereby a lateral distance D between the shafts 2 and 4 is obtained that lies between the two extreme values obtained by placing the parts 20 and 21 in the first and second position with respect to one another.

Of course many variations of such a connection 14 according to the invention can be realised by increasing the number of holes 24, changing the eccentricities I and J and similar.

Figure 7:
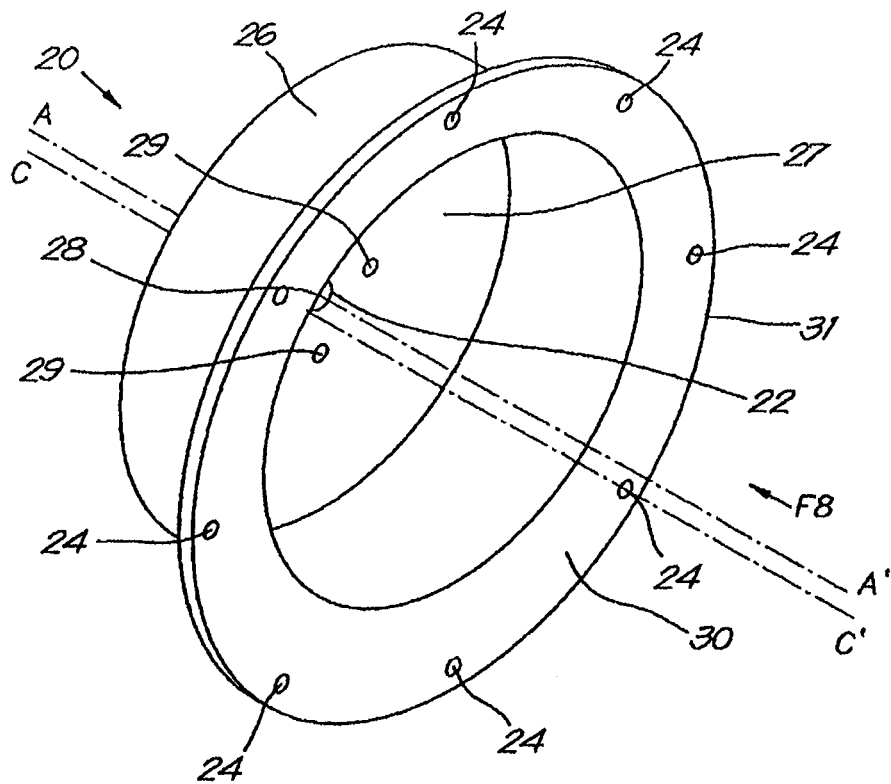
FIG. 7 shows a perspective view of the part of the housing of a connection according to the invention designated by F7 in FIG. 6.
Figure 8:
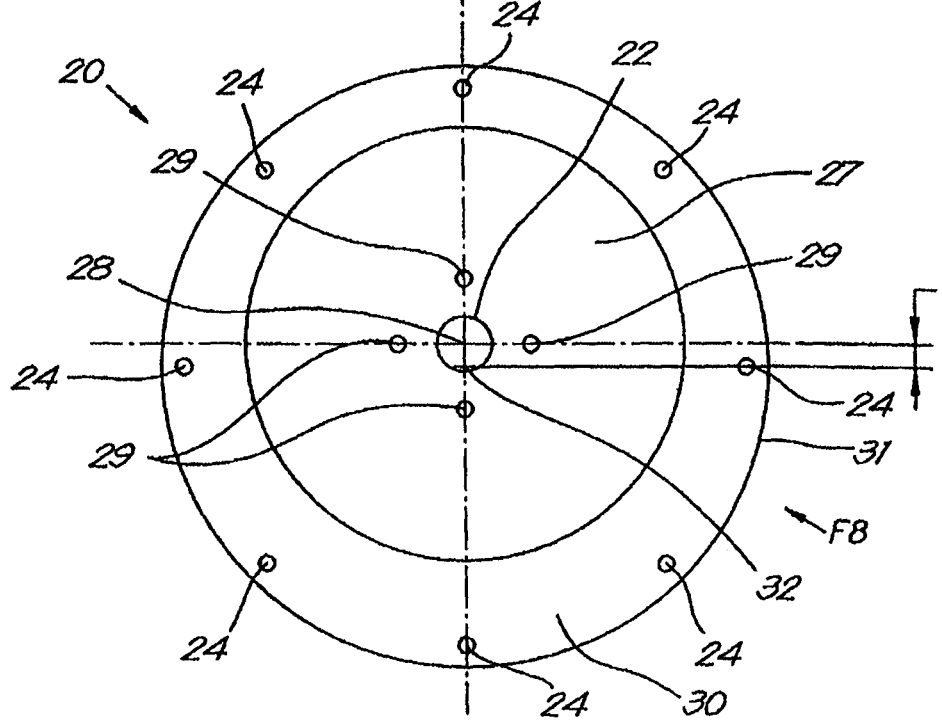
FIG. 8 shows a front view according to arrow F8 on the part of the housing of FIG. 7.

In FIGS. 7 and 8 the first part 20 of the housing 8 is shown separately, from which it can be clearly deduced that in this case the first part 20 of the housing 8 is constructed as a cylindrical casing 20 with a cylinder wall 26 and a circular base 27 with centre 28, in which centrally in the base 27 there is a hole 22 with centre 28 for the drive shaft 2 or the driven shaft 4.

If, as in the previous FIGS. 3 to 6, the drive shaft 2 is affixed through the hole 22, then in this case the central axis of symmetry of the cylinder wall 26 and the base 27 coincides with the axial direction AA' of the drive shaft 2.

In the base 27, holes 29 are also placed concentrically around the centre 28 in order to be able to bolt the first part 20 to the housing 10 of the motor 3 with bolts 12, for example.

On the edge of the cylinder wall 26 opposite the base 27 there also is a flange 30 with a circular periphery 31 and centre 32, whereby the holes 24 in this flange 30, which form the identically shaped coupling elements 24, are placed concentrically around the centre 32 of the circular flange 30.

It is important to note that the centre 32 of the flange 30 does not lie on the central axis of symmetry of the cylinder wall 26 or thus on the axial direction AA' of the drive shaft, but is placed with a certain eccentricity I with respect to this central axis of symmetry.

As the holes 24 in the flange 30 form the coupling elements 24 with which the first part 20 of the housing 8 is connected to the second part 21 of the housing 8, in the example shown the central axis of symmetry of the flange 30 corresponds to the rotational axis of symmetry CC' of the coupling elements 24, mentioned above.

The second part 21 of the housing 8 is not shown separately, but it is clear that such a second part can be easily formed by a disk-shaped cover 21 with a circular periphery that corresponds to the circular periphery 31 of the flange 30, and in which holes 25 are provided corresponding to the holes 24 of the flange 30.

By further placing the hole 23 in this cover 21 with a certain eccentricity J with respect to the centre of the cover 21, all the advantages of a connection according to the invention are obtained, as discussed above.

Figure 9:
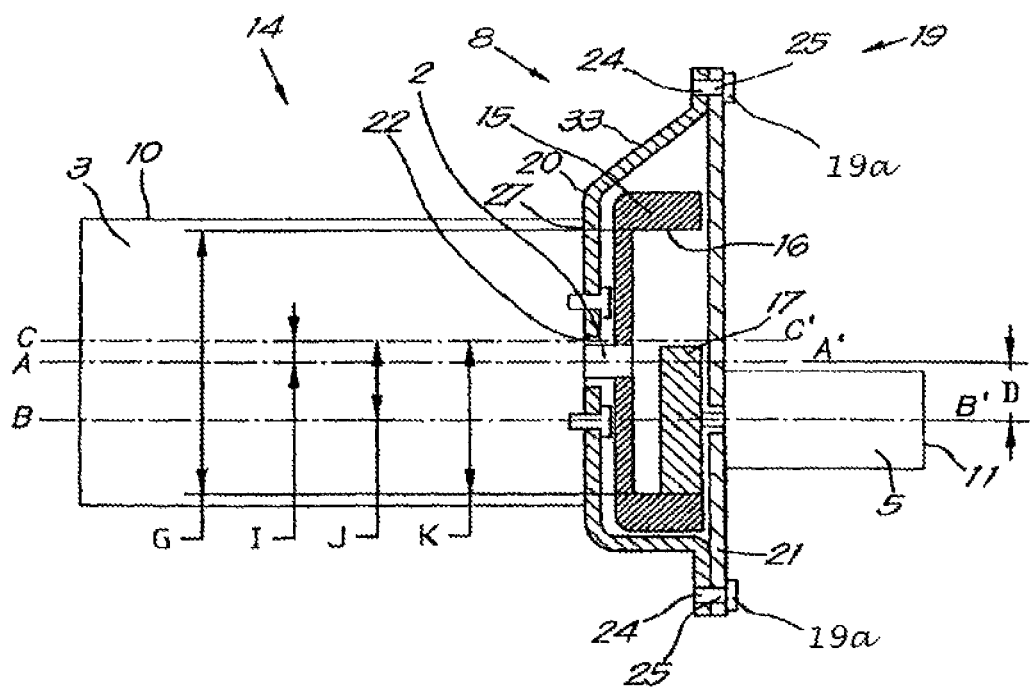
FIG. 9 shows a longitudinal cross-section, analogous to FIG. 5, through a connection according to the invention in which a different housing is used.

FIG. 9 further illustrates that the specific form of the parts 20 and 21 do not have to be as discussed above, whereby in this case the first part 20 does not have a cylindrical wall 26 but a wall that has a certain chamfer 33 towards the flange 30 from the base 27.

Of course many other embodiments are not excluded.

In the description and the drawings the drive shaft is always a motor shaft, but the term "a drive shaft of a motor" according to the invention is not limited as such, as this drive shaft can for example also be a shaft that is connected to a motor shaft by means of a coupling.

The present invention is by no means limited to the embodiments of a connection 14 according to the invention described as an example and shown in the drawings, but a connection 14 according to the invention can be realised in all kinds of variants, without departing from the scope of the invention.

The invention claimed is:

1. A connection for connecting a drive shaft of a motor and a driven shaft of a driven apparatus, wherein the drive shaft extends in an axial direction and the driven shaft parallel to the drive shaft, at a certain lateral distance from the axial direction, extends in a parallel axial direction, the connection comprising:
    a housing, said housing on the one hand being connectable to a housing of the motor, and on the other hand being connectable to a housing of the driven apparatus,
    a drive gearwheel connectable to the drive shaft, and
    a driven gearwheel connectable to the driven shaft, wherein the drive gearwheel and the driven gearwheel mesh directly with one another, and
    wherein the drive gearwheel and driven gearwheel are affixed in the housing of the connection,
    wherein the drive gearwheel or the driven gearwheel is a ring gear with internal toothing and the remaining gearwheel of the connection is a pinion with external toothing, and
    wherein the housing of the connection comprises adjustment means with which the lateral distance between the driven shaft and the drive shaft is adjustable and wherein the housing of the connection comprises a first part and a second part, said first part and said second part each having a hole through which either the drive shaft or the driven shaft is able to be affixed, and
    wherein the adjustment means comprise fasteners with which the first part and the second part of the housing are able to be detachably fastened to one another in at least a first position and a second position to change the lateral distance between the driven shaft and the drive shaft.

2. Connection according to claim 1, wherein the ring gear with internal toothing is the drive gearwheel and the pinion is the driven gearwheel.

3. The connection according to claim 1 or 2, wherein the first part of the housing is connected to the housing of the motor, and the second part of the housing to the housing of the driven apparatus.

4. The connection according to claim 1 or 2, wherein the second part of the housing is connected to the housing of the motor, and the first part of the housing to the housing of the driven apparatus.

5. The connection according to claim 1 or 2, wherein the first part of the housing forms a casing for the gearwheels and the second part a removable cover to close off the casing.

6. The connection according to a claim 1 or 2, wherein the first part of the housing can be fastened to the second part with the fasteners in at least the first position and the second position, whereby, after releasing the fasteners, the first part of the housing is taken from the first position to the second position by rotating the first part over a certain angle, combined or otherwise with one or more axial movements to move the first part and the second part to and from one another, and whereby in an assembled state of the connection the fasteners on each part of the housing present a rotational symmetry with respect to a common rotational axis of symmetry that does not coincide with the axial direction of the drive shaft, or the axial direction of the driven shaft.

7. The connection according to claim 1 or 2, wherein the first part of the housing can be fastened to the second part of the housing in a number of positions with the fasteners, whereby, after releasing the fasteners, the first part can be taken from the first position to a different position by rotating the first part over a certain angle, combined or otherwise with one or more axial movements to move the first part and the second part to and from one another, and whereby in an assembled state of the connection the fasteners on each part of the housing present a rotational symmetry with respect to a common rotational axis of symmetry that does not coincide with the axial direction of the drive shaft, or with the axial direction of the driven shaft.

8. The connection according to a claim 1 or 2, wherein the fasteners consist of a number of identically shaped coupling elements that are provided on the first part of the housing and which mate with a number of identically shaped coupling elements that are provided on the second part of the housing, whereby in an assembled state of the connection the coupling elements on each part of the housing present a rotational symmetry with respect to a common rotational axis of symmetry that does not coincide with the axial direction of the drive shaft, or with the axial direction of the driven shaft.

9. The connection according to claim 8, wherein the first part of the housing has a cylinder wall with a circular base in which there is a hole in the centre for the drive shaft or the driven shaft, whereby on the edge of the cylinder wall opposite the base there is a flange with a circular periphery, whereby holes are placed in this flange concentrically around the central axis of symmetry of the circular flange to form identically shaped coupling elements with a rotational axis of symmetry, and whereby the central axis of symmetry of the cylinder wall and base, which in the assembled state of the connection corresponds to the axial direction of the drive shaft or the parallel axial direction of the driven shaft, does not coincide with the aforementioned rotational axis of symmetry.

10. The connection according to claim 9, wherein the second part of the housing is a disk-shaped cover with a circular periphery that corresponds to the circular periphery of the flange and the first part of the housing, and whereby there are holes in the disk-shaped cover to form identically shaped coupling elements corresponding to the holes in the flange.

11. The connection according to claim 10, wherein the identically shaped coupling elements are at least partly formed by holes that are placed at a regular distance from one another on a circular periphery around the rotational axis of symmetry in the first part and the second part of the housing, and whereby the fasteners comprise bolts and/or nuts which in the assembled state of the connection are affixed through the aforementioned holes.

12. A connection between a drive shaft of a motor and a driven shaft of a driven apparatus, whereby the drive shaft extends in an axial direction and the driven shaft parallel to this, at a certain lateral distance from the axial direction, extends in a parallel axial direction,
    whereby the connection is realised by means of a drive gearwheel on the drive shaft and a driven gearwheel on the driven shaft, whereby the drive gearwheel and the driven gearwheel mesh directly with one another, and these gearwheels are affixed in a housing, and this housing is on the one hand connected to a housing of the motor, and on the other hand is connected to a housing of the driven apparatus, characterised in that the drive gearwheel or the driven gearwheel is a ring gear with internal toothing and the remaining gearwheel of the connection is a pinion with external toothing, wherein the housing of the connection is equipped with adjustment means with which the lateral distance between the driven shaft and the drive shaft can be adjusted and wherein the housing of the connection comprises a first part and a second part, and these parts each have a hole through which a shaft is affixed, either the drive shaft or the driven shaft, and whereby the aforementioned adjustment means are formed by fasteners with which the first part and the second part of the housing can be detachably fastened to one another, and wherein the second part of the housing is connected to the housing of the motor, and the first part of the housing to the housing of the driven apparatus.

13. An air compressor comprising a motor having a drive shaft and a compressor having a driven shaft, and a connection between the drive shaft of the motor and the driven shaft of the compressor, wherein the drive shaft extends in an axial direction and the driven shaft parallel to the drive shaft, at a certain lateral distance from the axial direction, extends in a parallel axial direction, wherein the connection comprises:
a housing, said housing being connected to a housing of the motor, and connected to a housing of the compressor,
a drive gearwheel coupled to the drive shaft, and
a driven gearwheel coupled to the driven shaft, wherein the drive gearwheel and the driven gearwheel mesh directly with one another, and
wherein the drive gearwheel and driven gearwheel are affixed in the housing of the connection,
wherein the drive gearwheel or the driven gearwheel is a ring gear with internal toothing and the remaining gearwheel of the connection is a pinion with external toothing, and
wherein the housing of the connection comprises adjustment means with which the lateral distance between the driven shaft and the drive shaft is adjustable and wherein the housing of the connection comprises a first part and a second part, said first part and said second part each having a hole through which either the drive shaft or the driven shaft is affixed, and
wherein the adjustment means comprise fasteners with which the first part and the second part of the housing are able to be detachably fastened to one another.

* * * * *